(No Model.) 2 Sheets—Sheet 2.
G. ILLSTON.
VELOCIPEDE.
No. 383,396. Patented May 22, 1888.
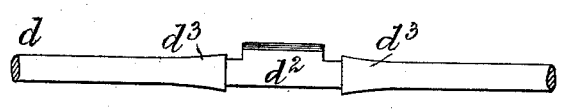
FIG. 5.
FIG. 6.
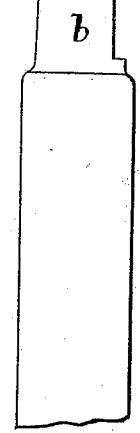
Witnesses:—
Richard Skerrett.
Arthur J. Powell.
Inventor:—
George Illston.

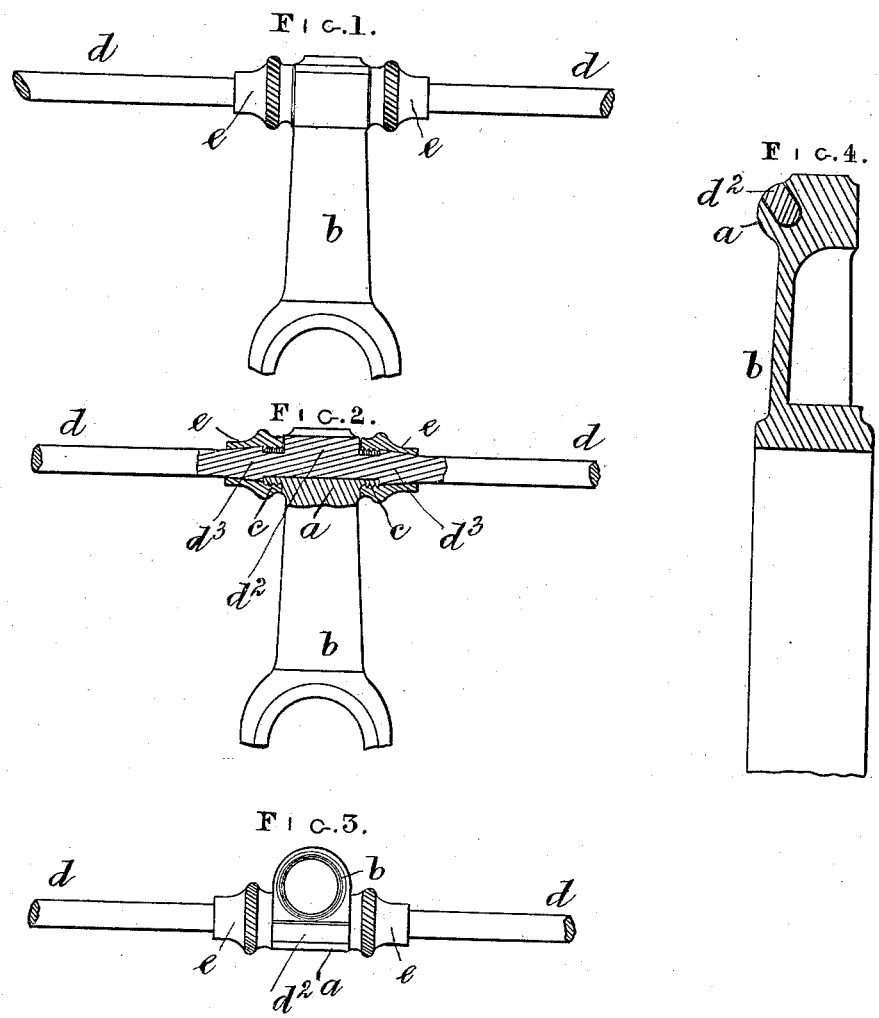

UNITED STATES PATENT OFFICE.

GEORGE ILLSTON, OF BIRMINGHAM, COUNTY OF WARWICK, ENGLAND, ASSIGNOR TO THE ROYAL MACHINE MANUFACTURING COMPANY, (LIMITED,) OF SAME PLACE.

VELOCIPEDE.

SPECIFICATION forming part of Letters Patent No. 383,396, dated May 22, 1888.

Application filed March 2, 1887. Serial No. 229,444. (No model.) Patented in England November 12, 1879, No. 4,606.

*To all whom it may concern:*

Be it known that I, GEORGE ILLSTON, of Birmingham, in the county of Warwick, England, a subject of the Queen of Great Britain, have invented Improvements in Bicycles and Tricycles, (for which I have obtained a patent in Great Britain, No. 4,606, bearing date November 12, 1879,) of which the following is a specification.

My invention consists of the construction and arrangement, hereinafter described, of the parts of detachable handles for bicycles and tricycles, whereby the removal of the handle from the head of the bicycle or tricycle and its replacement and fixing thereon are very readily effected.

I make near the top of the head of the bicycle or tricycle a cross hollow bracket open at its ends and top. The said bracket has externally a nearly cylindrical figure, and its ends are furnished with convex screws. The interior of the hollow bracket is trough-shaped. I make the handle-bar nearly flat at its middle, the bottom part being curved and of a size proper to seat itself in and fill the open top of the hollow or trough bracket described of the head. The upper portion of the flattened middle of the bar is of less length than the lower portion, the contracted upper portion being of the same length as the unscrewed part of the hollow or trough bracket. On each side of the middle flattened part of the handle-bar is a sliding collar milled externally and screwed internally with a concave screw proper to fit on the convex screw at the end of the hollow or trough bracket on the head.

In connecting the detachable handle to the head of the bicycle or tricycle the flattened middle part of the handle-bar is dropped into the hollow or trough bracket on the head, the contracted upper part of the flattened bar filling up the opening in the top of the trough, excepting at its screwed ends, at which parts there is no obstruction. By sliding the screwed collars to the middle of the handle-bar and screwing them upon the screwed ends of the trough or hollow bracket the handle-bar is securely connected to the head of the bicycle or tricycle. By unscrewing the said screw-collars from the ends of the hollow bracket the handle-bar is unfastened, and may be lifted from the hollow bracket and removed. The detachable handle is in this way readily connected to or disconnected from the head of the bicycle or tricycle, and when connected is very secure.

I will now proceed to describe, with reference to the accompanying drawings, the manner in which my invention is to be performed.

Figure 1 represents in side elevation, Fig. 2 in longitudinal vertical section, Fig. 3 in plan, and Fig. 4 in cross-section, a detachable handle-bar connected to the head of a bicycle or tricycle according to my invention. Fig. 5 represents, in front elevation, the said handle and the screw-collars of the same detached from the head of the bicycle or tricycle; and Fig. 6 represents a side elevation of the said head and handle-bar.

The same letters indicate the same parts in Figs. 1, 2, 3, 4, 5, and 6.

$a$ is the hollow bracket, made near the top of and crossing one side of the head $b$ of the bicycle or tricycle. The said bracket $a$ is open at its ends and top, and the interior of the said bracket has the trough form. (Best seen in the cross section, Fig. 4, and end elevation, Fig. 6.) On the ends of the said trough-shaped bracket $a$ are convex screws $c$ $c$.

$d$ is the handle-bar, the grips or wooden parts of the handle being omitted. The middle part, $d^2$, of the handle-bar is flat and has a shape proper to seat itself in and fill up the trough-shaped bracket $a$, as seen in Fig. 4. The upper portion of the flattened part $d^2$ of the bar has the same length as the unscrewed part of the trough-bracket $a$, so that when the said flattened part of the bar is fitted in the trough $a$ it does not project into the screwed ends of the said trough-bracket $a$.

$e$ $e$ are sliding collars on the handle-bar. The said collars $e$ $e$ are milled externally and screwed internally with screws proper to fit on the convex screws $c$ $c$ at the ends of the trough-bracket $a$.

To connect the detachable handle to the head $b$ of the bicycle or tricycle, the flattened middle part, $d^2$, of the handle-bar $d$ is dropped into the trough-bracket $a$ on the head $b$, as seen in Figs. 2 and 4. The screw-collars $e\ e$ are now moved toward the middle of the handle bar and screwed upon the screws $c\ c$ at the ends of the trough-bracket $a$. The handle-bar $d\ d^2$ is thereby securely connected to the head of the bicycle or tricycle, as illustrated in Figs. 1, 2, 3, and 4. The parts $d^3\ d^3$ of the handle-bar, where they join the middle flattened part, $d^2$, are made slightly conical, and the interior of the rear parts of the screw-collars $e\ e$ are also made slightly conical to fit upon the conical parts $d^3\ d^3$ of the bar when the said screw-collars are screwed home.

By making the parts $d^3\ d^3$ of the handle-bar $d$ conical and the rear parts of the collars $e\ e$ conical, as represented, great firmness is given to the parts when they are screwed together, as seen in Fig. 2. When it is wished to remove the detachable handle, the screw-collars $e\ e$ are unscrewed from the screws $c\ c$ at the ends of the hollow or trough bracket $a$. The handle-bar $d\ d^2$ is thereby unfastened, and may be lifted from the hollow bracket $a$, as represented in Figs. 5 and 6.

Having now described the nature of my invention and the manner in which the same is to be performed, I wish it to be understood that I claim as my invention—

1. The combination, with a head, $b$, having an angular open trough at its upper portion, of a continuous handle-bar, $d$, having the angular portion $d^2$ centrally between its ends removably fitting said trough, and devices engaging the handle-bar and the ends of the trough, substantially as described.

2. The combination of the head having an open trough, a continuous handle-bar, and sleeves on the bar for securing the latter in the trough, substantially as described.

3. In a handle for bicycles and other vehicles, the combination of a head, $b$, having a trough at its upper portion provided with convex screw-threaded extensions $c$, the bar $d$, having a flattened central portion, $d^2$, adapted to said trough, and internally-threaded collars $e$ on the bar, adapted to the convex threaded extensions for confining the bar in the trough, substantially as described.

GEORGE ILLSTON. [L. S.]

Witnesses:
RICHARD SKERRETT,
ARTHUR J. POWELL.